Sept. 9, 1969 W. S. GILES 3,466,009
VALVE STEM RETAINER AND LOCK ASSEMBLY
Filed Oct. 5, 1966 2 Sheets-Sheet 2
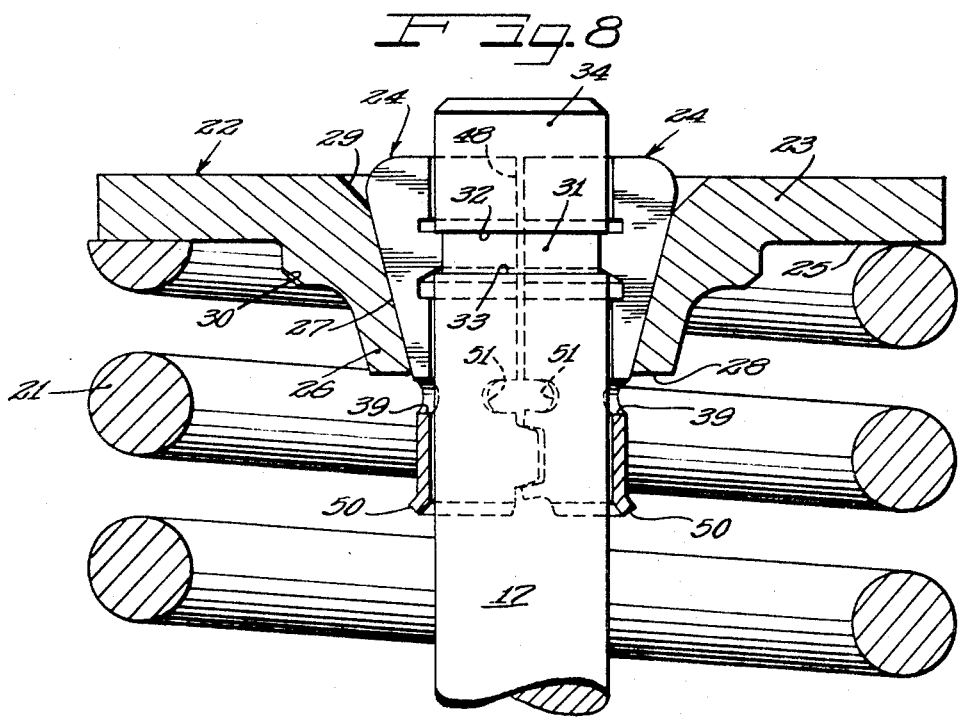
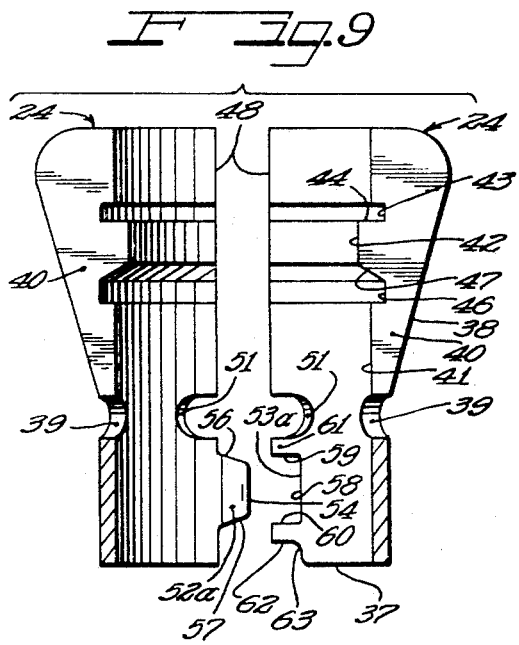
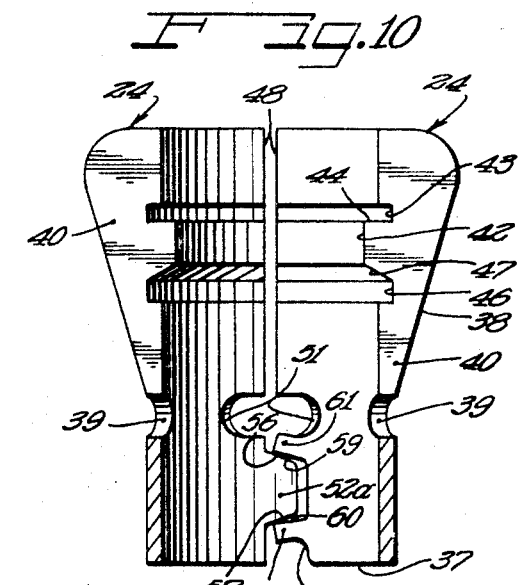
INVENTOR.
William S. Giles
BY Hill, Sherman, Meroni, Gross & Simpson
ATTORNEYS United States Patent Office 3,466,009
Patented Sept. 9, 1969

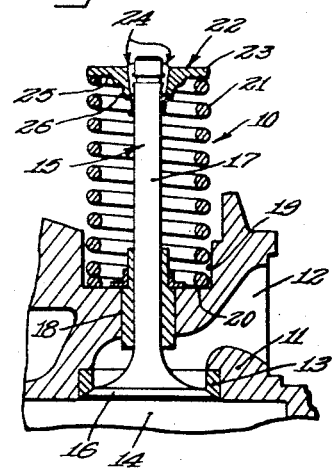

3,466,009
VALVE STEM RETAINER AND LOCK ASSEMBLY
William S. Giles, Highland Heights, Ohio, assignor to TRW Inc., Cleveland, Ohio, a corporation of Ohio
Continuation-in-part of application Ser. No. 387,680, Aug. 5, 1964, now Patent No. 3,338,228, dated Aug. 29, 1967. This application Oct. 5, 1966, Ser. No. 584,595
Int. Cl. F16k 51/00; F01l 3/24
U.S. Cl. 251—337                                4 Claims

ABSTRACT OF THE DISCLOSURE

A valve stem lock and a unitized valve stem lock assembly in which the lock is split axially to provide two or more segments which are retained in the bore of a valve spring retainer by means of out turned flanges formed on the segments and which are wedged toward each other in the retainer bore by a wedging action between the retainer and the outer walls of the segments. Cooperating bosses and recesses are formed on the longitudinal edges of the segments to maintain a substantial axial alignment of the segments in the retainer bore.

---

This application is a continuation-in-part of my copending application Ser. No. 387,680 entitled "Valve Stem Retainer Lock," now Patent No. 3,338,228.

The present invention relates generally to a valve stem lock and a unitized valve spring retainer and valve stem lock assembly and more particularly to a multiple member or segmental valve stem lock and an assembly comprising a valve spring retainer with the individual segments of the lock retained thereon.

In said copending application, I disclose a one-piece valve stem lock as well as an assembly which combines the one-piece lock with a valve spring retainer. In the present invention, the lock is actually made up of individual members which has the effect of reducing manufacturing costs, since the individual members can be made in a stamping operation on automatic machinery and which additionally enables the lock and retainer assembly to be more easily mounted on a valve stem because of the ease with which the individual members are separated during the assembly operation.

Although the valve stem lock may comprise several individual members or segments, two segments, each of which is substantially semi-cylindrically shaped, are sufficient to satisfactorily attain the objects of the invention.

In order to prevent substantial longitudinal or axial misalignment of the two segments during insertion of the tip of the valve stem into the lock, as a result of which one of the segments could "hang up" on the valve stem end while the other segment seated in the valve groove, the longitudinal edges of the segments are provided with cooperating bosses or tangs and recesses which mate to preclude substantial relative axial movement therebetween.

Summary of the invention

In view of the foregoing the present invention may be summarized as comprising a valve stem lock assembly including an axially split valve stem lock mounted in the bore of a retainer and including a plurality of segments having fragmental cylindrical bottom end portions and shiftable axially in the retainer bore substantially the entire axial length of the bottom end portions. The segments comprise longitudinal edges having circumferentially projecting bosses extending into cooperating recesses sufficiently to maintain the segments in substantial axial alignment throughout the limit of their axial shiftability.

In one form of the invention the recesses are formed of circumferentially extending tangs which, when abutted by the bosses, are deformed to provide oil seals between the longitudinal edges of adjacent segments.

It is, therefore, an object of the present invention to provide a valve stem lock and valve spring retainer assembly adapted to be easily and quickly seated and assembled with a valve stem.

Another object of the invention is to provide a valve stem lock adapted to be relatively inexpensively manufactured.

Another object of the invention is to provide a segmental valve stem lock with means for preventing substantial axial misalignment of the segments when they are assembled with a valve spring retainer.

Another object of the invention is to facilitate the mounting of a valve spring retainer on a valve stem through the utilization of a multi-member valve stem lock affording increased tiltability and separation of the members during assembly of the retainer on the stem.

Another object of the invention is to provide means for minimizing oil leakage along the gaps between the segments of a segmental valve stem lock.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

On the drawings:

FIGURE 1 is a fragmentary longitudinal cross-sectional view, with parts in elevation, of an engine poppet valve assembly equipped with a valve stem lock and spring retainer assembly of this invention;

FIGURE 2 is a top plan view of the valve stem lock and spring retainer assembly shown in FIGURE 1;

FIGURE 3 is an enlarged fragmentary cross-sectional view of the valve tip end of the assembly of FIGURE 1 illustrating the valve stem lock and retainer in greater detail and showing the valve stem in elevation;

FIGURE 4 is a bottom plan view of the lock and retainer assembly of this invention taken along lines IV—IV of FIGURE 3;

FIGURE 5 is a side elevational view of one of the valve stem lock segments of this invention;

FIGURE 6 is a front or inside elevational view of the segment of FIGURE 5;

FIGURE 7 is an inside elevational view of a pair of segments illustrating a locking arrangement formed on the longitudinal confronting edges of the segments;

FIGURE 8 is an enlarged fragmentary cross-sectional view of the valve tip end of as assembly similar to that illustrated in FIGURE 1 but showing another embodiment of the valve stem lock segments adapted to minimize oil leakage along the gaps between the segments;

FIGURE 9 is an inside elevational view of a pair of segments of the embodiment shown in FIGURE 8 illustrating the configuration of the locking arrangement before final assembly; and FIGURE 10 is similar to FIGURE 9 but illustrates the configuration of the locking arrangement after final assembly.

As shown on the drawings:

Although the principles of the present invention are applicable in any arrangement wherein a valve stem lock and spring retainer assembly are adapted for mounting on a valve stem, a particularly useful application is made in a poppet valve assembly in an internal combustion engine.

In FIGURES 1–4, reference numeral 10 indicates generally an internal combustion engine poppet valve assembly constructed in accordance with the principles of the present invention. The engine includes a cylinder head 11 having a port 12 and a valve seat ring 13 disposed at the mouth of the port and communicating with a combustion chamber 14 of the engine.

Gas flow through the port 12 is under the control of a poppet valve 15 which comprises a head 16 seatable on the ring 13 and a stem 17 slidably mounted in a stem guide 18 carried by the cylinder head 11.

The cylinder head 11 also provides a well 19 having a bottom wall 20 surrounding the stem guide 18. A valve spring indicated at 21 urges the valve 15 to a closed position on the seat ring 13 as shown in FIGURE 1. A bottom end of the spring 21 is seated on the bottom wall 20 of the well 19 and a top end is retained by a valve stem lock and spring retainer assembly constructed in accordance with this invention and indicated generally at reference numeral 22.

The unitized assembly 22 comprises a spring retainer 23 and a valve stem lock comprising plural lock segments 24 carried in the retainer 23.

The spring retainer 23 is more particularly characterized as comprising a disc having a flat radial shoulder 25 which receives the top end coil of the valve spring 21 and a depending cylindrical collar portion 26 inwardly of the shoulder 25 defining a conical bore 27 diverging upwardly from a small bottom end 28 to an outwardly beveled mouth 29 at the top of the disc. A raised pilot portion 30 is provided between the radial shoulder 25 and the collar 26 on the bottom face of the disc to project into the end coil of the spring 21, thereby centering the spring concentrically in spaced relation around the valve stem 17.

As shown in FIGURE 3, a tip end 34 of the stem 17 has formed therein a circumferentially continuous groove 31 providing a pair of radial retaining shoulders 32 and 33. The top shoulder 32 is spaced inwardly from the tip end 34 of the stem a distance sufficient to provide a strong land area above the top shoulder 32.

The valve stem lock of this invention is made up of plural lock segments 24 and in the illustrative embodiment herein shown, the lock comprises two identical segments.

Referring to FIGURES 5–7, each lock segment 24 comprises a generally semi-tubular metal body with a generally semi-cylindrical bottom end portion 36 terminating at a bottom end wall 37. The bottom end portion 36 extends upwardly to a semi-conical portion 38 which diverges upwardly.

A horizontal or circumferential slot 39 is cut centrally through the body and the segment is split at its upper end as at 40 with the split extending from the slot 39 to the top of the segment 24.

An inner wall 41 of the lock segment 24 is semi-cylindrical and of substantially uniform diameter from the bottom to the top thereof, thus providing a generally cylindrical bore when a pair of the segments are mated together. The wall 41 has a superimposed bead 42 projecting inwardly therefrom and extending transversely around the wall. The bead 42 has a radial depth sufficient to fit into the groove 31 of the valve stem 17. A circumferential groove 43 provides a radial shoulder 44 at the upper end of the bead 42 to engage the shoulder 32 of the stem 17 and another groove 46 is formed at the bottom end of the bead and includes a tapered wall 47 converging inwardly to the diameter of the bead 42.

The segment 24 has radial side walls or longitudinal edges 48, 48 along the length thereof which extends in parallel relation to the longitudinal edges of the other segment when the two segments are assembled in the unitized assembly 22. The pair of segments form a generally complete tube receiving the valve stem therethrough. The inner wall 41 of this tube is spaced radially outwardly from the valve stem, but the bead 42 projecting into the groove 31 of the valve stem locks the stem axially with respect to the segments.

The tapered wall portion 38 of the segments 24 mate with the tapered bore 27 of the retainer 22 to be wedgelocked therein. Since the inner wall 41 of each segment 24 is semi-cylindrical and since the outer wall portion 38 of each segment diverges from the small semi-cylindrical end portion 36 to an upper end wall 49, the segments increase in thickness along the length of the tapered portion 38 and are thickest at the increased diameter end of this tapered portion.

To form the unitized assembly 22, a pair of segments 24 is dropped into the large beveled end 29 of the retainer 23. The smaller cylindrical ends 36 of the segments 24 project beyond the small end 28 of the bore 27 and the wedge-action of the bore urges the two segments toward each other. The bottom end 37 of the segments are then flared outwardly as at 50 to an outer diameter greater than the diameter of the bore 27 at the small end 28 thereof. The segments are thus held in the retainer bore, but can shift axially with respect to the bore and can tilt apart with respect to each other.

To mount the unitized assembly 22 on the valve stem 17, the assembly 22 is positioned vertically directly above the tip end 34 of the stem 17, and in this position the segments 24 drop by gravity to project beyond the small end 28 of the bore 27. The cylindrical portions 36 of the segments 24 and the outturned ends 50 are below the small end mouth 28 of the bore 27. The tubular bore defined by the inner walls 41 of the mated segments 24 is large enough to receive the tip end 34 of the stem 17, and the assembly 22 slips over this tip end of the stem up to the level of the bead 42. As the inclined walls 47 of the beads 42 engage the tip end 34 of the stem 17, their downward movement is arrested, but a further downward force causes the inclined walls 47 to ride over the tip end of the stem 17 causing the segments 24 to rock apart. The assembly 22 will then continue downwardly on the stem 17 until the groove 31 in the valve stem receives the beads 42 on the segments 24.

Insertion of the tip end of the stem 17 into the segments 24 is facilitated by the slots 39 and the splits 40 formed in each of the segments which enable the tapered portions 38 of the segments to spread or bend outwardly.

As the load of the spring 21 is allowed to act against the retainer 23, the bore 27 rides up the tapered portions 38 of the segments 24 to wedge the segments into the bore 27 and to urge the shoulders 44 of the beads 42 solidly against the shoulder 32 of the valve stem 17. The assembly 22 is thus locked on the valve stem 17.

The spreading ability of the tapered portions 38 may be increased by the provision of half-slots 51, 51 opening to the longitudinal edges 48, 48. The half-slots 51, 51 in the embodiment illustrated are circumferentially aligned with the slot 39.

In the embodiment illustrated in FIGURE 7, means are provided for preventing substantial axial misalignment of the two segments 24, 24 as the tip end 34 of the valve stem is being inserted therein as a result of "hanging up" of one of the segments on the tip of the stem. Accordingly, a boss or ear 52 projects circumferentially from a longitudinal edge 48 of one of the segments 24 into a complemental recess 53 opening into the longitudinal edge of a mating segment 24. A similar ear and recess may be formed in the opposite pair of mating longitudinal edges 48, 48 of the segments 24, 24. The ears 52 and recesses 53 preferably extend sufficiently circumferentially such that even when the segments are moved upwardly in the bore 27 of the retainer 23 as far as possible, the ears 52 are still disposed within the recesses 53 to prevent substantial axial misalignment of the pair of mating segments 24, 24 regardless of the axial disposition of the segments within the bore 27.

In the embodiment illustrated in FIGURES 8–10, the misalignment prevention arrangement of FIGURE 7 is modified to also prevent or minimize oil leakage along the gaps between adjacent lock segments 24, 24.

For example, in the assembly of FIGURE 3, the mating faces of the bore 27 of the retainer and of the conical walls 38 of the segments 24 substantially prevents the leakage of oil axially between the retainer and the segments. Similarly, the abutment of the beads 42 with the groove 31 of the valve stem prevents leakage between the segments and valve stem. An axial leak path does exist, however, in the spaces between the side walls 48 of adjacent segments. The same situation exists even if the FIGURE 7 embodiment of the lock segments is substituted for the embodiment thereof shown in the assembly of FIGURE 3.

Utilization of the embodiment of the lock segments 24 shown in FIGURES 8-10, however, not only substantially or completely eliminates the leakage of oil between the retainer and the lock segments and between the lock segments and the valve stem, but also the longitudinal side walls of the adjacent lock segments.

In this embodiment, wherein parts similar to the various parts of the other embodiments of the lock segments are given similar reference numerals an ear 52a projecting from the longitudinal edge 48 of one of a pair of segments 24 is characterized as having a longitudinally extending outer wall 54 and a pair of converging or tapered side walls 56 and 57. A cooperating recess 53a formed in the other of the pair of segments 24 is rectangularly shaped and comprises a longitudinal inner wall 58 and a pair of spaced parallel end walls 59 and 60 to form a pair of spaced circumferentially extending tangs 61 and 62 at opposite ends of the recess 53a.

The ear 52a is oversized in a longitudinal direction with respect to the recess 53a although the longitudinal dimension of the forward or outer wall 54 of the tang is less than that of the recess 53a to enable the forward wall to fit into the recess. The tangs 61 and 62 are deformable so that upon forced insertion of the ear 52a into the recess 53a the converging walls 56 and 57 will interfere with the walls 59 and 60 of the tangs and spread the tangs outwardly.

FIGURE 9 represents the relative disposition of the ear 52a and the recess 53a of a pair of lock segments 24 assembled within the bore 27 of a retainer 23 but before the segments have been moved downwardly within the bore to be wedged toward each other by the wedging action of the bore wall.

FIGURE 10 shows the interference fit of the side walls 56 and 57 of the ear 52a and the tangs 61 and 62 after the segments 24, 24 have been moved downwardly in the bore 27 of a retainer 23 and wedged toward each other. Note that the tangs 61 and 62 have been spread outwardly by the tapered ear 52a to ensure abutting engagement and thus an oil seal between the tangs 61 and 62 and the ear 52a.

Tang 61 is located adjacent and forms an end wall of the half-slot 51 of its segments 24, thereby conferring upon the tang the ability to be spread outwardly by the ear 52a. Tang 62 is proximately spaced from the bottom end wall 37 of the segment and is joined thereto by a curved interconnecting wall 63 whereby tang 62 can be deformed outwardly independently of the flared-out bottom portion 50 of the cylindrical end 36 of the segment.

Although minor modifications might be suggested by those versed in the art, it should be understood that I wish to embody within the scope of the patent warranted hereon all such modifications as reasonably come within the scope of my contribution to the art.

I claim as my invention:

1. A unitized valve spring retainer and valve stem lock assembly comprising,
   a valve spring retainer having a tapered bore therethrough,
   a plurality of valve stem lock segments in said retainer bore and adapted to be wedged toward each other by the taper of said bore for defining a valve stem receiving bore therethrough,
   bead means formed on said segments projecting into said valve stem receiving bore for seating in a valve stem groove to lock the stem against axial movement,
   means for retaining said segments within the bore of said retainer while accommodating axial shifting of said segments relative to said retainer bore,
      said segments comprising a tapered outer wall and a fragmental cylindrical inner wall on which said bead means is formed,
      said retaining means comprising a fragmental cylindrical extension depending from the small end of each of said segments and adapted to be flared outwardly to retain the segments in the retainer bore,
      said segments further comprising a pair of longitudinal edges and means forming cooperating longitudinally aligned bosses and recesses along the edges of adjacent segments to maintain substantial longitudinal alignment of the segments with each other in the retainer bore,
      said recess forming means of each of said segments being located on said fragmental cylindrical extension and comprising a pair of longitudinally spaced circumferentially extending tangs,
      said cooperating bosses being tapered in the direction of said recesses to fit between and to spread the tangs as the adjacent segments are wedged toward each other.

2. A unitized valve spring retainer and valve stem lock assembly comprising,
   a valve spring retainer having a tapered bore therethrough,
   a plurality of valve stem lock segments in said retainer bore and adapted to be wedged toward each other by the taper of said bore for defining a valve stem receiving bore therethrough,
   bead means formed on said segments projecting into said valve stem receiving bore for seating in a valve stem groove to lock the stem against axial movement,
   means for retaining said segments within the bore of said retainer while accommodating axial shifting of said segments relative to said retainer bore,
      said segments each having a tapered outer wall and fragmental cylindrical inner wall on which said bead means is formed,
      said retaining means comprising a fragmental cylindrical extension depending from the small end of each of said segments and adapted to be flared outwardly to retain the segments in the retainer bore,
      said segments further comprising a pair of longitudinal edges and means forming cooperating longitudinally aligned bosses and recesses along the edges of adjacent segments to maintain substantial longitudinal alignment of the segments with each other in the retainer bore,
      means forming longitudinally aligned half-slots in the edges of adjacent segments for providing full slots extending across the longitudinal edges of the adjacent segments.

3. A unitized valve spring retainer and valve stem lock assembly comprising,
   a valve spring retainer having a tapered bore therethrough,
   a plurality of valve stem lock segments in said retainer bore and adapted to be wedge toward each other by the taper of said bore for defining a valve stem receiving bore therethrough,
   bead means formed on said segments projecting into said valve stem receiving bore for seating in a valve stem groove to lock the stem against axial movement, and means for retaining said segments within the bore of said retainer while accommodating axial shifting of said segments relative to said retainer bore,
  said segments each having a tapered outer wall and a fragmental cylindrical inner wall on which said bead means is formed,
  said retaining means comprising a fragmental cylindrical extension depending from the small end of each of said segments and adapted to be flared outwardly to retain the segments in the retainer bore,
  each of said segments comprising a pair of longitudinal edges,
means forming cooperating longitudinally aligned bosses and recesses along the longitudinal edges of adjacent segments to maintain substantial longitudinal alignment of the segments with each other in the retainer bore,
  said recess forming means comprising,
  a pair of circumferentially extending tangs axially spaced a distance which is less than the axial length of the corresponding boss to be engaged and spread by the boss as the segments are wedged toward each other in the tapered bore of the retainer to provide an oil seal between the longitudinal edges of adjacent segments.

4. A valve stem lock segment for combining with similar segments in the tapered bore of a valve spring retainer to form a unitized valve spring retainer and valve stem lock assembly comprising,
  a fragmental substantially tubular member having a tapered outer wall and a fragmental cylindrical inner wall,
  at least one bead projecting from said inner wall to provide a valve stem retaining shoulder, and a fragmental cylindrical extension depending from the small end of said tubular member and adapted to be flared outwardly for retaining the segment within the tapered bore of a valve spring retainer,
  means forming a pair of longitudinal edges,
  boss and recess means formed along said edges to mate with cooperating longitudinally aligned boss and recess means formed in the edges of adjacent segments in a retainer bore to maintain longitudinal alignment of the segments with each other relative to the bore,
  said recess forming means comprising a pair of circumferentially extending tangs axially spaced a distance which is less than the axial length of the corresponding boss to be engaged and spread by the boss as the segments are wedged toward each other in the tapered bore of the retainer to provide an oil seal between the longitudinal edges of adjacent segments.

References Cited
UNITED STATES PATENTS

| | | | |
|---|---|---|---|
| 1,393,348 | 10/1921 | Davenport | 251—337 |
| 1,573,048 | 2/1926 | Fancher et al. | |
| 1,761,925 | 6/1930 | Lampman. | |
| 1,965,718 | 7/1934 | Wiley. | |
| 2,705,486 | 4/1955 | Norton. | |
| 2,789,458 | 4/1957 | Skeisvoll | 85—33 |
| 2,820,442 | 1/1958 | Wilson. | |
| 3,273,856 | 9/1966 | Tauschek | 251—337 |

CARL W. TOMLIN, Primary Examiner

ANDREW V. KUNDRAT, Assistant Examiner

U.S. Cl. X.R.

123—188; 287—52.4